Feb. 24, 1970  J. D. MICHIE ET AL  3,496,633
METHOD OF PRODUCING AN IMPROVED ELASTOMERIC STRAIN GAUGE
Filed July 12, 1968
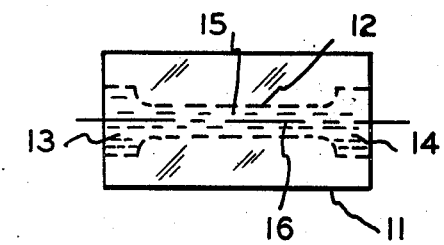
FIG. 1
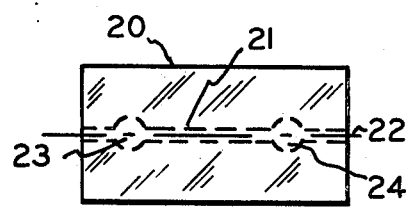
FIG.2
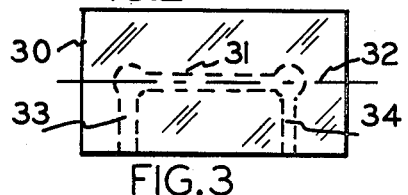
FIG.3
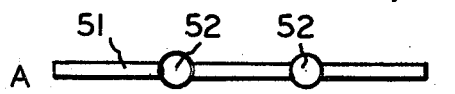
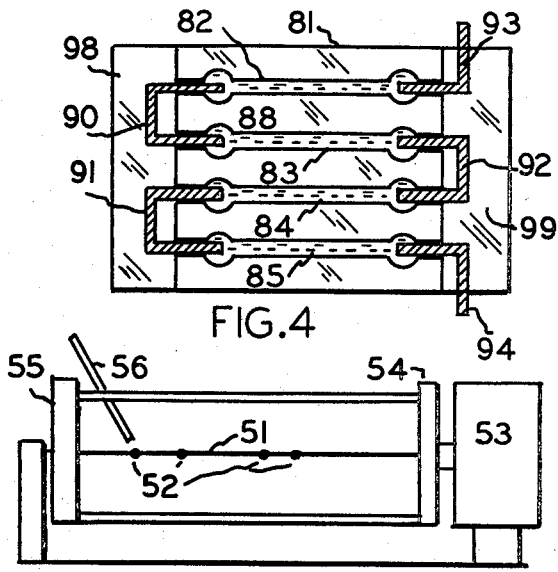
FIG.4
FIG.5
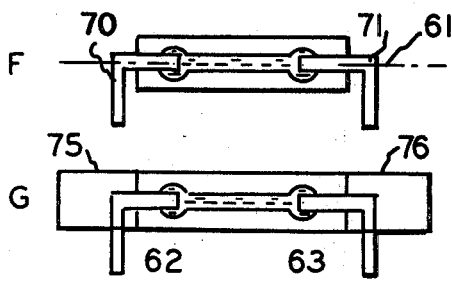
FIG.6
INVENTORS
JARVIS D. MICHIE
EUGENE L. ANDERSON
LEONARD U. RASTRELLI
BY
*Richard J. Miller*
ATTORNEY

United States Patent Office 3,496,633
Patented Feb. 24, 1970

3,496,633
METHOD OF PRODUCING AN IMPROVED ELASTOMERIC STRAIN GAUGE
Jarvis D. Michie, Leonard U. Rastrelli, and Eugene L. Anderson, San Antonio, Tex., assignors, by mesne assignments, to the United States of America as represented by the Secretary of the Navy
Filed July 12, 1968, Ser. No. 744,514
Int. Cl. H01c 1/02, 11/00, 17/00
U.S. Cl. 29—613     3 Claims

ABSTRACT OF THE DISCLOSURE

This invention deals primarily with a method of producing and improving elastomeric strain gauges utilizing the steps of rotating a filament of nylon or similar material and depositing thereon small amounts of thermosetting plastic which forms at least two spherical droplets, placing the filament in a molding, casting an elastomeric housing about the filament, removing the filament and the droplets, trimming the elastomeric housing, filling the housing with an electrically conductive fluid, inserting leads into the spherical reservoirs filled with the electrically conductive fluid, and closing the ends of the housing with an elastomeric material sealing the leads and the electrically conducting material within the housing.

---

There is additionally disclosed an improved elastomeric strain gauge prepared by the above described method.

The elastomeric strain gauge as such has been produced for sometime and several improvements have been made therein. Initially relatively large strain gauges were made of fairly large size polyurethane material and filled with an electrical conductive fluid, generally mercury, having included therein copper or platinum wire terminals having the ends sealed to prevent the possible loss of fluid. A near linear electric resistance change was noted as the strain gauge was elongated.

However, since this was the first of the family of strain gauges it was necessarily crude. Improvements have been forthcoming and the disclosure of this invention deals with one particular improvement.

It is therefore an object of this invention to provide a method of producing an improved elastomeric strain gauge having reduced cross-sectional area of the capillary tube and a pair of near spherical reservoirs filled with electrically conductive material.

It is yet a further object of this invention to provide an elastomeric strain gauge having a plurality of parallel capillaries interconnected therein for providing an increased change in resistance for unit elongation of the elastomeric strain gauge housing.

It is still a further object of the invention to provide an improved elastomeric strain gauge having terminals brought out at right angles to the longitudinal axis of the capillary tube in the strain gauge for providing an improved terminal connection.

Other objects, advantages and novel features of the invention will become apparent from the following detailed description of the invention when considered in conjunction with the accompanying drawings wherein:

FIGURE 1 shows a form of the prior art strain gauge;
FIGURE 2 shows a first embodiment of the improved strain gauge produced by the method of this disclosure;
FIGURE 3 shows a second configuration of an improved strain gauge produced by the methods of this invention;
FIGURE 4 shows an improved strain gauge utilizing the method of this invention to produce an improved or shortened strain gauge;
FIGURE 5 shows a method of forming the thermosetting plastic droplets on a filament of nylon or other material utilized in the method of this invention; and
FIGURE 6, A through G, shows the various steps in the method of this invention.

Referring now to the figures it can be seen in the prior art device that a transparent elastomeric body 11 has passing therethrough generally a passageway or capillary tube 12 and has first and second reservoirs 13, 14. Such a housing would be filled with an electrically conductive material, generally designated as 15, and a pair of electrodes, not shown, would seal the ends of the reservoir 13, 14 and be in contact with the electrical conductive material. Upon elongation of the housing member 11 along its longitudinal axis, generally designated at 16, the cross-sectional area of the capillary tube 12 would diminish in area and the electrical resistance between reservoirs 13 and 14 would increase. Thus, if an electrical current would be passed through the material 15 where the housing was elongated there would be a decrease in electrical current which would be measured by an external meter not shown.

The embodiment produced by the method of this invention as shown in FIGURE 2 has a different construction, although generally it includes a housing 20, a main capillary tube 21 positioned along a longitudinal axis 22, first and second reservoirs 23, 24 positioned along the capillary tube 21.

In the embodiment shown in FIGURE 3, the housing 30 has a first capillary 31 located along its longitudinal axis 32, and has second and third capillaries 33, 34 positioned at right angles to the longitudinal axis 32. The purpose of the right angle capillaries 33 and 34 is to provide a firmer seating for the leads to be inserted later as hereinafter discussed.

FIGURE 5 shows a method of forming a filament of nylon or other material 51 having thereon a plurality of droplets of near spherical configuration 52. An electrical motor 53 drives first and second fixtures 54, 55 in a slowly rotating manner so that the filament 51 rotates. A feed device 56 drops small amounts of the thermosetting plastic on the filament 51 and due to the turning motion of the filament the droplets assume a near perfect spherical shape about the filament 51. The filament is shown in FIGURE 6, parts A and B, the droplets are 52, also shown.

The method of producing the improved elastomeric strain gauge is set forth in the steps shown in FIGURE 6 and is as follows. A filament 51 is produced having thermosetting plastic droplets 52, as shown in FIGURE 5A and FIGURE 5. The next step is to tension the filament member in a mold and an elastomeric housing 58 is cast thereabout. The resulting structure appears as in FIGURE 6B. The next step is to remove the filament and plastic droplets by stripping them out or other means and the housing 58 results having first and second reservoirs 59, 60 positioned about a longitudinal axis 61 of the housing 58.

The next step is to trim the housing 58 so that it appears as in D of FIGURE 6 having first and second ends 62, 63. Then the housing 58 is filled with an electrically conductive material 66, as shown in FIGURE 6E. The next step is to insert a pair of leads 70, 71 in the ends of the capillary tube 61, as shown in FIGURE 6F. It should be noted that the leads are shown having a portion at right angles to the longitudinal axis 61 and the final step is to affix end portions 75, 76 to the end portion 62, 63 of the housing. These end portions are then cured and the result is an improved strain gauge produced by the teachings of this invention.

Should it be desirable to have an improved short strain gauge such a device may be constructed along the lines shown in FIGURE 4. Therein is shown in cross-section an elastomeric housing 81 having first, second, third and fourth capillaries 82, 83, 84, and 85, substantially parallel to each other and individually having reservoirs at the ends thereof. The entire device is filled with electrical conductive material. Additionally, first and second U-shaped electrical conductive members 90, 91 are inserted between capillaries 82 and 83, 84 and 85. A U-shaped electrical conductive member 92 is connected between the capillaries 83 and 84 as shown. Additionally, leads 93 and 94 are inserted within the reservoirs at the end of capillaries 82, 85, and sealed by end members 98, 99. The advantage of this construction is to provide an elastomeric strain gauge having four capillaries which would elongate under tension and would hence increase the linear dimensions of the electrical conductive material which is constricted due to the elongation of the elastomeric material.

The embodiment of FIGURE 4 may be looked upon as an elastomeric strain gauge having a plurality of small passageways extending through the housing of the gauge. Individual passageways consisting of a capillary tube terminating in spherical reservoirs with additional capillary tubes extending from the spherical reservoirs to the end of the housing. Electrical wires which are U-shaped extend from approximately the center of the spherical reservoirs out the capillaries connected to the reservoirs, past the end of the housing. The lead 90, for example, then makes a right turn and a second right turn and enters a capillary tube connecting a spherical reservoir in the next passageway.

The gauge would be constructed as follows: A plurality of filaments would be tensioned parallel to each other in a mold and in close proximity, with the spherical plastic portions substantially aligned to each other. The elastomeric material would then be cast about the filament and the steps as set forth above then followed.

It should be noted that although the gauge is shown being substantially planar in construction that with the teaching of this invention it would be possible to design an elastomeric strain gauge having whatever configuration was desired so that it might be that a design could be measured.

Obviously many modifications and variations of the present invention are possible in the light of the above teachings. It is therefore to be understood that within the scope of the appended claims the invention may be practiced otherwise than as specifically described.

I claim:
1. A method of providing an improved elastomeric strain gauge, comprising the following steps;
    (a) producing an elongated filament member having positioned thereon at least two plastic droplets having substantially spherical configurations;
    (b) positioning said filament member under tension in a mold;
    (c) casting an elastomeric housing about said filament member;
    (d) removing said filament member;
    (e) trimming said housing to a predetermined length;
    (f) filling said housing with an electrically conductive material; and
    (g) inserting lead members in said capillary and affixing first and second end members to said housing member to seal said housing, so that the lead members extend beyond said end members for coupling to electrical circuits.
2. The method of claim 1 wherein said lead members are positioned in said end members so that they have a portion at right angles to said housing.
3. The method of claim 1 wherein the droplets of thermosetting plastic are formed by dropping small portions of plastic upon a slowly rotating filament of nylon or other material held under tension.

References Cited
UNITED STATES PATENTS

| 2,518,906 | 8/1950 | Kochmich | 338—2 X |
| 2,536,101 | 1/1951 | Shoub | 338—2 |
| 3,304,528 | 2/1967 | Rastrelli et al. | 338—2 |
| 3,428,933 | 2/1969 | Gerstenberger | 338—2 |

RICHARD A. FARLEY, Primary Examiner

HERBERT C. WAMSLEM, Assistant Examiner

U.S. Cl. X.R.

29—619; 264—219; 338—2, 5